United States Patent [19]

Trudeau

[11] 4,226,437
[45] Oct. 7, 1980

[54] AXLE-LOAD DISTRIBUTING APPARATUS

[75] Inventor: Curtis A. Trudeau, Elk Point, S. Dak.

[73] Assignee: CMI Corporation, Oklahoma City, Okla.

[21] Appl. No.: 63,909

[22] Filed: Aug. 6, 1979

[51] Int. Cl.³ ............................................. B62D 61/12
[52] U.S. Cl. ............................. 280/405 R; 280/81 R
[58] Field of Search .......... 280/405 R, 405 A, 423 A, 280/446 R, 81 R; 180/24.02

[56] References Cited

U.S. PATENT DOCUMENTS

| | | | |
|---|---|---|---|
| 3,093,388 | 6/1963 | Kulyk | 280/405 A |
| 3,298,706 | 1/1967 | Lyall | 280/405 A |
| 3,485,505 | 12/1969 | Schmidt | 280/405 R |
| 3,512,802 | 5/1970 | La Rock | 280/405 A |
| 4,161,325 | 7/1979 | Schneider | 280/81 R |

*Primary Examiner*—John A. Pekar
*Attorney, Agent, or Firm*—Jerry J. Dunlap; Charles A. Codding; Glen M. Burdick

[57] ABSTRACT

An improved axle load-distributing device detachably mounted on the rear of a vehicle for transferring a portion of a load from the rear axles of the vehicle to the wheel supported axle of the load-distributing device. The device, which includes a wheel mounted frame assembly and pneumatic units operably connected thereto, is further provided with a tracking unit operably connected to the pneumatic units of the device which partially deactivates the pneumatic units when a predetermined angular relationship between the vehicle and the load-distributing device is detected by the tracking unit.

40 Claims, 7 Drawing Figures

4,226,437

AXLE-LOAD DISTRIBUTING APPARATUS

BACKGROUND OF THE INVENTION

1. Field of the Invention

This invention relates to an apparatus which may be detachably secured to the rearward end of an axle-supported vehicle frame to distribute axle loads. In one aspect, the invention relates to an improved axle load-distributing apparatus having a tracking unit for partial deactivation of the pneumatic units of the apparatus when a predetermined angular relationship between the towing vehicle and the apparatus is detected by the tracking unit.

2. Description of the Prior Art

Many states, for the protection of their highways, limit the maximum load which can be transmitted through an axle supporting frame of a vehicle. Thus, certain types of heavy equipment cannot be legally moved on highways without disassembling the equipment and moving portions of the disassembled equipment on separate vehicles, a procedure which is time consuming and expensive. Because of this situation, axle load-distributing devices have been proposed in the past which may be attached to the frame of a vehicle for the purpose of providing additional axle support for the vehicle and to distribute the load carried by the vehicle on a greater wheel base than is provided by the vehicle itself. However, a problem with many such devices has occurred when the vehicle pulling the device is caused to make a sharp turn as is frequently encountered in traffic situations in a city environment. For example, when the towing vehicle radically pivots relative to the axle load-distributing device, as during a sharp turn, the moment arm between the vehicle and the device changes. This affects the location of the center of gravity of the payload carried by the vehicle causing an unsafe, unstable condition.

Therefore, an object of the present invention is to provide an improved axle load-distributing apparatus which substantially reduces the before-mentioned problems Another object of the invention is to provide an axle load-distributing apparatus wherein pneumatic units are employed to transfer a portion of the load from the load carrying vehicle axles to those of the axle load-distributing apparatus while providing an effective and efficient means for at least partially deactivating the pneumatic units of the axle load-distributing apparatus when the vehicle is required to make sharp turns.

Other objects, advantages and features of the present invention will become apparent to those skilled in the art from a reading of the following detailed description when read in conjunction with the accompanying drawings which illustrate the invention.

BRIEF DESCRIPTION OF THE DRAWINGS

FIG. 5 is a partially broken, side elevation illustrating a modified embodiment of the axle load-distributing apparatus of the invention attached to the rear end of a truck.

DETAILED DESCRIPTION OF THE INVENTION

Referring now to the drawings in which like numerals are employed to designate like parts throughout same, and particularly to FIGS. 1, 2 and 5, axle load-distributing apparatus 10 is detachably mounted to the rear end portion of vehicle frame 12 in a manner which will be more fully described hereinafter. Vehicle frame 12 is mounted on wheels 14 by front axles (not shown) and dual rear axles 16. Axle load-distributing apparatus 10 is detachably mounted to the rear end portion of vehicle frame 12 in a manner which will be more fully described hereinafter. Axle load-distributing apparatus 10 is designed so that, when connected to vehicle frame 12 in an operable position, it will take a portion or percentage of the load off of dual rear axles 16 of the vehicle while at the same time transferring a portion of the load to the front axles of the vehicle.

Figure 1:
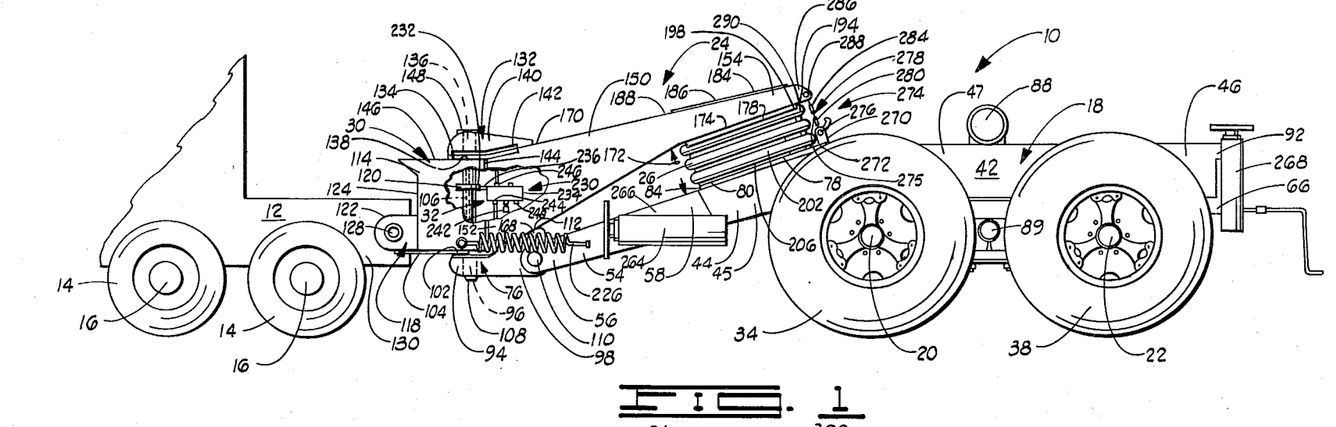
FIG. 1 is a partially broken, side elevation illustrating the axle load-distributing apparatus of the invention attached to the rear end of a truck.
Figure 2:
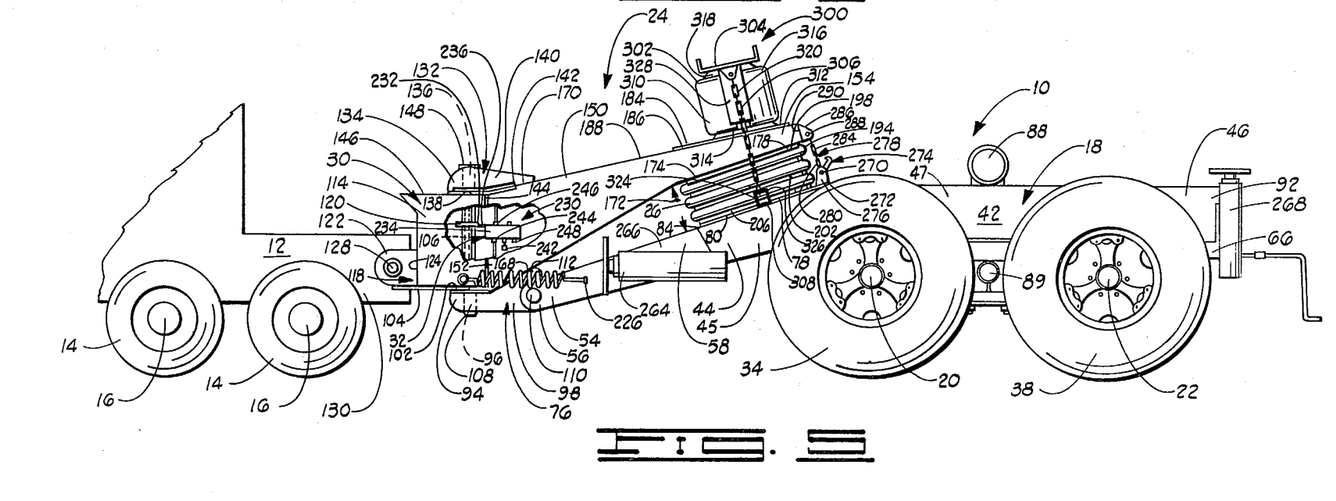
FIG. 2 is a partially broken, plan view, further illustrating the axle load-distributing apparatus of the invention.

Axle load-distributing apparatus 10 may be either a dual axle type, as shown in FIGS. 1, 2 and 5, or a single axle type. The load-distributing apparatus 10 shown in the drawings includes a lower frame 18 mounted on load-distributing axles 20 and 22, a rearwardly extending, upwardly inclining cantilever 24, a first air bag 26, a second air bag 28, a hitch 30, and a tracking unit 32. Transversing load-distributing axles 20 and 22 have dual wheels 34, 36, 38 and 40 rotatively supported at the respective ends thereof.

Lower frame 18 (see FIG. 2) comprises a first side frame member 42 having a forward end 44 and an opposed rearward end 46, a second side frame member 48 having a forward end 50 and an opposed rearward end 52, a first forward frame member 54 having a forward end 56 and an opposed rearward end 58, and a second forward frame member 60 having a forward end 62 and an opposed rearward end 64. A forward portion 45 of the first side frame member 42 and a forward portion 51 of the second side frame member 48 extend in a downwardly direction with respect to the longitudinal axis of the remainder portions 47 and 53 of the first side frame member 42 and the second side frame member 48, respectively, as shown. The first side frame member 42 is maintained in a parallel, spaced relationship with the second side frame member 48 by the transverse end support member 66 and transverse support member 68. The transverse load-distributing axles 20 and 22 are operatively connected to the first and second side frame members 42 and 48 by any suitable means well known in the art. The transverse end support member 66 having a first end portion 67(a) and an opposed second end portion 67(b) is secured at the first end portion 67(a) to the opposed rearward end 46 of the first side frame member 42 of the lower frame 18 and at the opposed second end portion 67(b) to the opposed rearward end 52 of the second side frame member 48 of the lower frame 18.

The transverse support member 68 having a first end 69(a) and an opposed second end 69(b) is secured at the first end 69(a) to the first side frame member 42 of the lower frame 18 at a position substantially intermediate the forward end 44 and the opposed rearward end 46 of the first side frame member 42, as shown in FIG. 2; and, the opposed second end 69(b) is secured to the second side frame member 48 of the lower frame 18 at a position substantially intermediate the forward end 50 and the opposed rearward end 52 of the second side frame member 48, as also shown in FIG. 2. The forward end 44 of the first side frame member 42 is secured to the opposed rearward end 58 of the first forward frame member 54 and the forward end 50 of the second side frame member 48 is secured to the opposed rearward end 64 of the second forward frame member 60 in such a manner so as to allow the forward ends 56 and 62 of the first and second forward frame members 54 and 60 to converge and terminate with a substantially U-shaped member 70.

The substantially U-shaped member 70 secured to the converged, forward end portions 56 and 62 of the first forward frame member 54 and the second forward frame member 60, respectively, is provided with a first forwardly extending leg member 72 and a second forwardly extending leg member 74. The second leg member 74 is maintained in a parallel, spaced relation with the first leg member 72, and each of the leg members 72 and 74 are provided with a bore (not shown) which are axially aligned one with the other, for pivotably securing the lower frame 18 to a lower strut member 76 and thus to the hitch 30. The central axis of the aligned bores of the first and second leg members 72 and 74 of the substantially U-shaped member 70 is substantially horizontal and transverse to the longitudinal axis of the towing vehicle and the axle load-distributing apparatus 10.

A cross support plate 78 having a first end 80 and an opposed second end 82 is secured at the first end 80 to an upper side 84 of the downwardly inclined forward portion 45 of the first side frame member 42 of the lower frame 18 and at the opposed second end 82 to an upper side 86 of the downwardly inclined forward portion 51 of the second side frame member 48 of the lower frame 18 in a position substantially as shown in the drawings. The cross support plate 78 serves as a lower support for the first and second air bags 26 and 28 and as an attaching structure for securing the first and second air bags 26 and 28 to the lower frame 18 of the axle load-distributing apparatus 10.

A first air reservoir 88, operatively connected to an air source, a portion of a brake assembly of the axle load-distributing apparatus 10, and to a second air reservoir 89, as will be discussed in detail hereinafter, is mounted on the traverse support member 68. The second air reservoir 89, operatively connected to the first air reservoir 88, the tracking unit 32 and the first and second air bags 26 and 28, as will likewise be discussed in detail hereinafter, is mounted to the lower frame 18 of the axle load-distributing apparatus 10. A control panel 90, containing instruments for regulating the flow of air to the first and second air bags 26 and 28 is mounted on the rearward end portion 92 of the axle load-distributing apparatus 10.

The lower strut member 76 includes a forward end 94 having a substantially vertically disposed bore 96 extending therethrough, and a rearward end 98 having a substantially horizontal bore (not shown) extending therethrough. The forward end 94 of the lower strut member 76 containing the substantially vertically disposed bore 96 is further provided with an upper support surface 102 for abutment with a lower connecting surface 104 of the hitch 30. Thus, the forward end 94 of the lower strut member 76 can be pivotably secured to the hitch 30 by aligning the vertically disposed bore 96 in the forward end 94 of the lower strut member 76 with a vertically disposed bore 106 in the hitch 30 and positioning a pivot pin 108 therein. Such pivotable attachment of the lower strut member 76 to the hitch 30 provides a single pivot axis which allows sidewise swinging movement of the lower frame 18 and the cantilever 24. The rearward end 98 of the lower strut member 76, (having the substantially horizontally disposed bore, not shown, therein) is positioned between the first forward extending leg member 72 and the second forwardly extending leg member 74 of the substantially U-shaped member 70. The horizontally disposed bore (not shown) of the rearward end 98 of the lower strut member 76 can be aligned with the bores (not shown) in the first and second forwardly extending leg member 72 and 74 of the substantially U-shaped member 70 so that a pivot pin 110 can be positioned therein. Such pivotable attachment of the lower frame 18 to the rearward end 98 of the lower strut member 76 through the substantially U-shaped member 70 provides a single pivot axis which permits vertical movement of the lower frame 18 of the axle load-distributing apparatus 10 due to uneven surface conditions in the road. The rearward end 98 of the lower strut member 76 is further provided with an upwardly inclined, rearwardly extending support surface 112 for mating with a lower connecting surface of the forward or butt end of the cantilever 24 as will be more fully described hereinafter.

Hitch 30 comprises a body member 114 having a vertically disposed bore 106 extending therethrough, a forwardly extending connecting member 118 for connecting the axle load-distributing apparatus 10 to the rear end portion of the vehicle frame 14, and a cam 120. Cam 120, a portion of the tracking unit 32 employed to partially deactivate the first and second air bags 26 and 28 of the axle load-distributing apparatus 10 when a predetermined angular relationship is created between the towing vehicle and axle load-distributing apparatus 10, will be discussed in detail hereinafter.

The forwardly extending connecting member 118 of the hitch 30 is depicted in FIG. 2 as a plurality of forwardly extending bracket members 122 secured at one end thereof to a forward side 124 of the body member 114 of the hitch 30 so as to extend forwardly from the body member 114 of the hitch 30 in a parallel, spaced relationship. Each of the forwardly extending portions of the bracket members 122 is provided with a bore 126 which is axially aligned with the bore 126 in each adjacent bracket member 122 for receiving a connecting pin 128 to thereby secure the axle load-distributing apparatus 10 to the vehicle frame 12 through a hitch 130 carried by and secured to the rearwardly extending end portion of the vehicle frame 12.

An upper strut member 132, which includes a forward end 134 having a substantially vertically disposed bore 136 extending therethrough and a lower connecting surface 138, a rearward end 140 having an upwardly, rearwardly extending, lower connecting surface 142, is pivotably connected to the upper portion of the body member 114 of the hitch 30 and extends therefrom in a rearwardly direction. The rearward end 140 of the upper strut member 132, the rearward end 98 of the lower strut member 76, and the rearward side 144 of the body member 114 of the hitch 30 cooperate to form a substantially C-shaped structure for receiving the forward or butt end of the cantilever 24. The pivotable attachment of the upper strut member 132 to the hitch 30 is accomplished by abutting the lower connecting surface 138 of the forward end 134 of the upper strut member 132 with an upper support surface 146 of the body member 114 of the hitch 30, aligning the vertically disposed bore 136 in the forward end 134 of the upper strut member 132 with the vertically disposed bore 106 in the body member 114 of the hitch 30 and positioning and securing pivot pin 148 therein. The pivotal attachment of the upper strut member 132 and the lower strut member 76 to the hitch 30, and the securing of the forward or butt end of the cantilever 24 to the rearward end 140 of the upper strut member 132 and the rearward end 98 of the lower strut member 76, provide a common vertical pivot axis for the cantilever 24 and the lower frame 18.

Rearwardly extending, upwardly inclining cantilever 24 comprises a first side member 150 having a forward or butt end 152 and a rearwardly, upwardly extending opposed end 154, a second side member 156 having a forward or butt end 158 and a rearwardly, upwardly extending opposed end 160, and a cross support member 162 having a first end 164 and an opposed second end 166. The first side member 150 and the second side member 156 of the cantilever 24 converge at their forward or butt ends 152 and 158, respectively, and are secured together in such a manner that their respective opposed ends 154 and 160 diverge outwardly one from another substantially as shown in FIG. 2. The first end 164 of the cross support member 162 is secured to the opposed end 154 of the first side member 150 of the cantilever 24 and the opposed second end 166 of the cross support member 162 is secured to the opposed end 160 of the second side member 156 of the cantilever 24. Thus, cantilever 24, as depicted in FIG. 2, has a substantially triangular configuration.

The forward or butt end 152 of the first side member 150 and the forward or butt end 158 of the second side member 156 of the cantilever 24, which as previously stated converge and are joined, are positioned within the substantial C-shaped (the substantially C-shaped strut being formed by the rearward end 98 of the lower strut member 76, the rearward side 144 of the body member 114 of the hitch 30, and the rearward end 140 of the upper strut member 132,) and secured therein by any suitable means, such as welding a lower side portion 168 of the forward or butt ends 152 and 158 of the first and second side members 150 and 156, respectively, of the cantilever 24 through a lower connecting surface to the lower strut member 76 through the upwardly inclined rearwardly extending support surface 112 of the rearward end 98 of the lower strut member 76; and by welding the upper side portion 170 of the forward or butt ends 152 and 158 of the first and second side members 150 and 156, respectively, of the cantilever 24 through an upper support surface to the upper strut member 132 through the upwardly, rearwardly extending lower connecting surface 142 of the rearward end 140 of the upper strut member 132. By connecting the forward or butt end of the cantilever 24 in this manner a space 172 is formed between lower sides 174 and 176 of the rearwardly, upwardly extending opposed ends 154 and 160 of the first and second side members 150 and 56, respectively, of the cantilever 24, and the upper side 84 of the forward portion 45 of the first side frame member 42 of the lower frame 18 and the upper side 86 of the forward portion 51 of the second side frame member 48 of the lower frame 18.

Desirably, in the interest of maximum strength and minimum weight, the first side member 150 and the second side member 156 of the cantilever 24, as well as the cross support member 162, are of a hollow, fabricated steel construction. To facilitate in the strengthening of the cantilever 24, as well as functioning as an upper support and attaching structure for the first and second air bags 26 and 28, a second cross-support plate 178 (shown in phantom lines in FIG. 2) is secured at one end 180 to the lower side 174 of the first side member 150 of the cantilever 24 and at an opposed second end 182 to the lower side 176 of the second side member 156 of the cantilever 24; and, a third cross-support plate 184 is secured at one end 186 to an upper side 188 of the first side member 150 of the cantilever 24 and at an opposed second end 190 to an upper side 192 of the second side member 156 of the cantilever 24.

The first and second air bags 26 and 28 are positioned with the space formed between the second cross-support plate 178 (shown in phantom lines in FIG. 2) carried by the first and second side members 150 and 156 of the cantilever 24, and the cross-support plate 78 carried by the foward end portions 45 and 51 of the first and second side frame members 42 and 48 of the lower frame 18. The upper end portions 194 and 196 of the first and second air bags 26 and 28, respectively, are secured to the second cross-support plate 178, and thus to the cantilever 24, by clamps 198 and 200, and the lower opposed end portions 202 and 204 of the first and second air bags 26 and 28, respectively, are secured to the cross-support plate 78, and thus to the lower frame 18, by clamps 206 and 208. Therefore, when the first and second air bags 26 and 28 are inflated, e.g. in an actuated position, they cause a downward force to be applied to the lower frame 18 which results in a portion of the load on the rear axles 16 of the vehicle being transferred to the load-distributing axles 20 and 22 of the apparatus 10.

The first and second air bags 26 and 28 employed in the axle load-distributing apparatus 10 are of a conventional structure and are well known in the art. Generally such air bags are provided with an upper and lower metallic reinforcing disc. The upper disc in each air bag can thus cooperate with the clamps 198 and 200 to secure the upper end portions 194 and 196 of the first and second air bags 26 and 28 to the second cross-support plate 178; and, the lower disc in each air bag can cooperate with the clamps 206 and 208 to secure the lower opposed end portions 202 and 204 of the first and second air bags 26 and 28 to the cross-support plate 78.

The axle load-distributing apparatus 10, as previously stated, is provided with a first air reservoir 88 operatively connected to an air source and the brake assembly of the apparatus. The brake assembly, a conventional assembly, is depicted in FIG. 2 as a plurality of units 210 and 212 carried by the load-distributing axle 20 and operatively connected to wheels 34 and 36 by means well known in the art; and units 214 and 216 carried by the load distributing axle 22 and operatively connected to wheels 38 and 40. The first air reservoir 88 which supplies air to units 210, 212, 214 and 216 via air lines 218, 220, 222 and 224, respectively, is operatively connected to the air source (not shown) of the towing vehicle through air lines 226 and 228.

Figure 3:
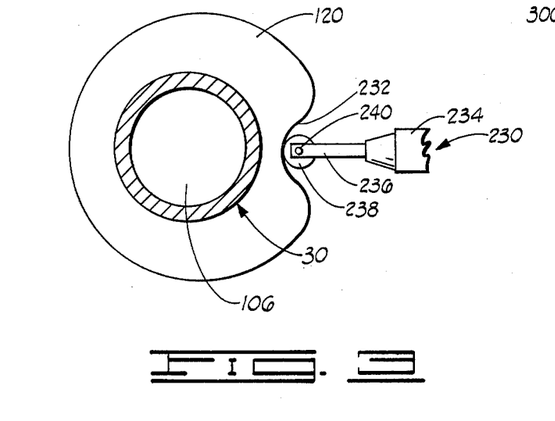
FIG. 3 is an enlarged plan view of the tracking unit of FIG. 1.
Figure 4:
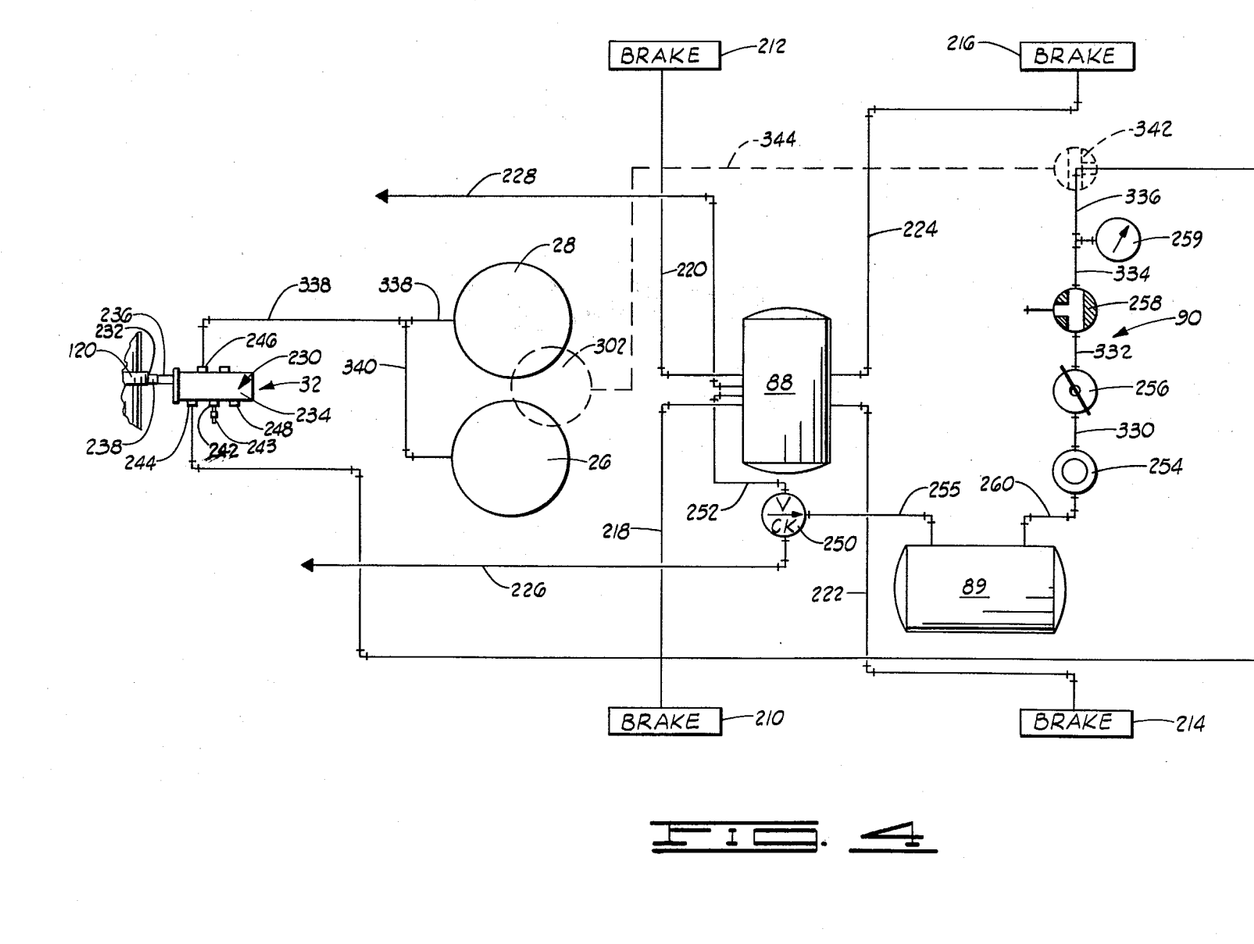
FIG. 4 is a simplified schematic diagram illustrating a pneumatic fluid supply for the pneumatic units employed according to the invention.

Referring now to FIGS. 3 and 4 in combination with FIGS. 1 and 5, the tracking unit 32, which operatively interconnects the hitch 30 to the cantilever 24 and to the first and second air bags 26 and 28 so that the air bags 26 and 28 are partially deflated when a predetermined angular relation between the longitudinal axis of the axle load-distributing apparatus 10 and the longitudinal axis of the towing vehicle is detected by the tracking unit 32, is illustrated in more detail. In the normal tracking or towing position, the longitudinal axis of the axle load-distributing apparatus 10 will be substantially aligned with the longitudinal axis of the towing vehicle. However, as the towing vehicle turns, an angular relationship is created between the longitudinal axis of the towing vehicle and the longitudinal axis of the axle load-distributing apparatus 10. The tracking unit 32 which readily detects a change in such angular relationship between the longitudinal axis of the towing vehicle and the longitudinal axis of the axle load-distributing apparatus 10 comprises cam 120 and a cam valve 230. The cam valve 230 is operatively connected to the second air supply reservoir 89 and the first and second air bags 26 and 28. The cam 120 is securely affixed to hitch 30 so that a cam surface 232 of the cam 120 faces in a direction towards the cantilever 24 and thus the cam valve 230. The cam valve 230 is mounted on the cantilever 24 at a position so that the cam valve 230 operatively engages the cam surface 232 of the cam 120.

The cam valve 230, a pneumatic valve such as is known in the art, comprises a cylinder 234, a reciprocating shaft 236 operatively disposed in the cylinder 234 and having one end extending outwardly therefrom, and a cam follower 238 secured to an outwardly extending end potion 240 of the reciprocating shaft 236. The cam follower 238 is positioned adjacent the cam surface 232 of the cam 120 to detect movements of the cam 120. The cylinder 234 is provided with a second air outlet 242, a safety valve 243, an air inlet 244 operatively connected to and in fluid communication with the second air supply reservoir 89, a first air outlet 246 operatively connected to and in fluid communication with the first and second air bags 26 and 28. The second air outlet communicates with the atmosphere through the safety valve 243.

The first air supply reservoir 88, operatively connected to and in fluid communication with the air system of the towing vehicle via air lines 226 and 228, is mounted on the transverse support member 68 of the lower frame 18 of axle load-distributing apparatus 10. The first air supply reservoir 88 functions as an air accumulator and is operatively connected to and in fluid communication with the brake units 210, 212, 214 and 216 by the air lines 218, 220, 222 and 224 so that the brakes of the axle load-distributing apparatus 10 can be activated by the driver of the vehicle when the need arises. Further, the first air supply reservoir 88 serves as an accumulator for the brake system and the second air supply reservoir 89 which is the supply source for the cam valve 230 and the first and second end air bags 26 and 28.

Since air supplied from the vehicle is employed to operate the air brakes of the axle load-distributing apparatus 10, as well as the source of air for the second air supply reservoir 89 (and thus the operation of the tracking unit 32 and the first and second air bags 26 and 28) a check or priority valve 250 is operatively connected to and in fluid communication with the air line 226 and the first air supply reservoir 88 via air line 252 (as well as the second air supply reservoir 89 via air line 255). The check on priority valve 250 insures that an effective amount of air, generally at least 65 psi, is transmitted to the first air supply reservoir 88 for the effective and efficient operation of the braking system of axle load-distributing apparatus 10 before allowing air to pass through the priority valve 250 into the second air supply reservoir 89 for operation of the tracking unit 32 and the first and second air bags 26 and 28.

The control panel 90, mounted on the rearward end portion 92 of the axle load-distributing apparatus 10, comprises a filter 254, an air regulator 256, a valve 258, and an air gauge 259, each of which are operatively connected to and in fluid communication with the priority valve 250 and the second air supply reservoir 89 via air lines 255 and 260, respectively. The operation and regulation of the pneumatic system for the first and second air bags 26 and 28 and the tracking unit 32 will be more fully described hereinafter.

To assist in the connecting and/or disconnecting of the axle load-distributing apparatus 10 to the vehicle frame 12, a landing gear 264 is pivotably attached to an exterior side 266 of the opposed rearward end 58 of the first forward frame member 54 of the lower frame 18. A second landing gear 268 is pivotably secured to the rearward end portion 92 of the axle load-distributing apparatus 10 for use when the need arises for changing tires or raising the lower frame 18 toward the cantilever 24 to secure the lower frame 18 in an inoperative position.

To accomplish the securing of the lower frame 18 to the cantilever 24 in the inoperative position, a bracket 270 is secured to a rearwardly extending portion 272 of cross-support plate 78 at a position rearward the first and second air bags 26 and 28 so as not to interfere with the operation of such air bags. A hook assembly 274 is pivotably secured to the bracket 270 by a retaining pin 276. One end 280 of a chain 278 is secured to the bracket 270 by the retaining pin 276 and the other end 284 of the chain 278 is secured to a bracket 286 by a retaining pin 288. The bracket 286 is attached to a rearwardly extending distal end 290 of the cantilever 24 as shown. The hook assembly 274 cooperates with the retaining pin 288 and the brackets 270 and 286 so that when air is exhausted from the first and second air bags 26 and 28 the lower frame 18 can be raised and secured in an inoperative position by operatively engaging the hook assembly 274 and the retaining pin 288.

Figure 6:
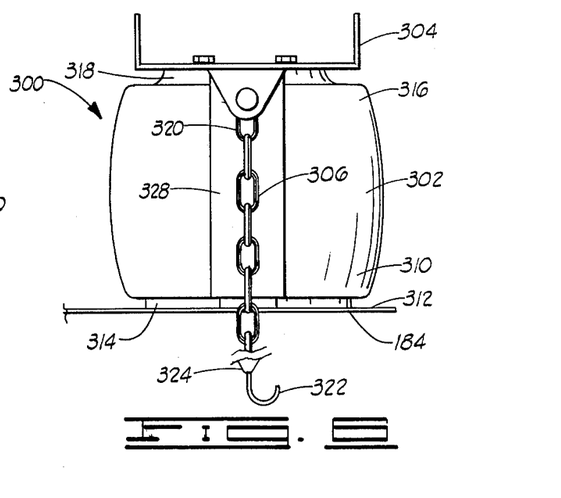
FIG. 6 is an enlarged side elevation illustrating the upper pneumatic unit of FIG. 5.
Figure 7:
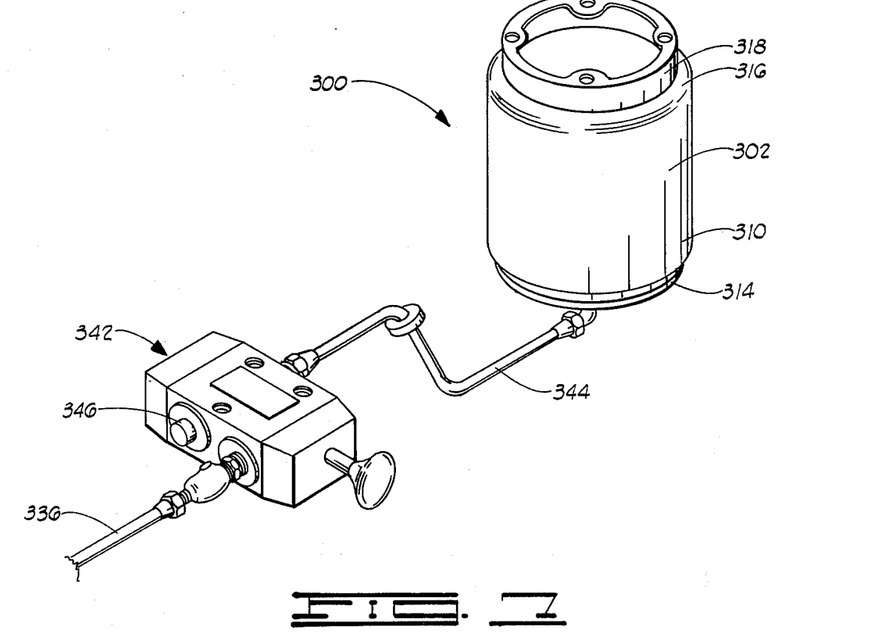
FIG. 7 is a simplified perspective view of the upper pneumatic unit of FIG. 5 and a pneumatic system for same.

Referring now to FIGS. 5, 6 and 7, a modification for raising the lower frame 18 of the axle load-distributing apparatus 10 to an inoperative position is depicted. In this embodiment, lower frame raising assembly 300 comprises an air bag 302, a cover plate 304, a chain 306 and an eyelet member 308. The air bag 302, of conventional construction, is secured at its lower end portion 310 to an upper surface 312 of the third cross support plate 184 by any suitable means, such as clamp 314. The air bag 302 is positioned above the first and second air bags 26 and 28 substantially intermediate their central vertical axis. The cover plate 304 is secured to the upwardly extending end portion 316 of the air bag 302 by a clamp 318. One end 320 of the chain 306 is pivotably secured to the cover plate 304 and a grab hook 322 is secured to the other end 324 of the chain 306. The eyelet member 308, secured to the lower frame 18 so as to be substantially aligned with the central vertical axis of the air bag 302, is adapted to receive the grab hook 322 and thus the chain 306 so that the cover plate 304 can be connected and secured to the lower frame 18.

The cover plate 304 is further provided with a downwardly extending leg member 328 which prevents the chain 306 and/or the grab hook 322 from rubbing the side of the air bag 302 and serves as a guide for the air bag 302. As is evident, since the lower frame 18 is to be raised or lowered with respect to the cantilever 24 by operation of the lower frame raising assembly 300, the leg member 328 must be positioned so as to not contact the cantilever 24.

OPERATION

In the normal operation of axle load-distributing apparatus 10, the air bag 302 will be deflated and the first and second air bags 26 and 28 will be inflated. When it is deemed desirable to raise the lower frame 18 with respect to the cantilever 24, the first and second air bags 26 and 28 are deflated and the chain 306, positioned through the eyelet member 308, is secured in a locked position by the grab hook 322 interlocking with one of the links of the chain 306. Thereafter, the air bag 302 is inflated and the inflation of the air bag 302, in combination with the securing of the cover plate 304 to the lower frame 18 via the chain 306, the grab hook 322 and the eyelet member 308, causes the lower frame 18 to be raised towards cantilever 24. Once the air bag 302 has been sufficiently inflated to raise the lower frame 18 to the desired height, the lower frame 18 can be ssecured in the inoperative position by the hook assembly 274, the bracket 286, and the retaining pin 288 as hereinbefore described.

While the lower frame raising assembly 300 has been described and depicted, for reasons of simplicity, as having a chain 306, a grab hook 322, an eyelet member 308 and a downwardly extending leg member 328, it should be understood that a pair of each of the elements are employed and that such are secured to opposite end portions of the cover plate 304 and to the opposite sides of the lower frame 18.

Referring specifically to FIGS. 4 and 7, the operation of the axle load-distributing apparatus 10 will be described. Air from the towing vehicle is supplied to the first air supply reservoir 88 via air lines 226 and 228 which are operatively connected to and in fluid communication with the air source of the towing vehicle. When the air pressure in the first air supply reservoir 88 reaches a level of at least about 65 psi, the priority or check valve 250 will open thus allowing air to flow into the second air supply reservoir 89 via the air line 255. Air from the second air supply reservoir 89 is supplied to the air regulator 256 via the air line 260, air filter 254 and air line 330. When it is determined desirable to inflate the first and second air bags 26 and 28 to transfer a portion of the weight from the rear axles of the towing vehicle to the front axles of said vehicle and to the axle load-distributing apparatus 10, the operator of the vehicle opens the air regulator 256 an effective amount as determined by air gauge 259 to allow inflation of the first and second air bags 26 and 28 to a predetermined pressure. Air is thus supplied to the first and second air bags 26 and 28 by air line 338 and 340 which are operatively connected to and in fluid communication with the second air reservoir 89 by way of the air filter 254 via air line 260, the air regulator 256 via air line 332, the valve 258 via air line 332, the air gauge 259, via air line 334, and the cam valve 230 via air line 336.

As previously stated, the cam valve 230 is provided with an air inlet 244 (operatively connected to and in fluid communication with the air line 336), a first air outlet 246 (operatively connected to and in fluid communication with the first and second air bags 26 and 28 via air lines 338 and 340), and a second outlet 242 which can be activated, as will be described, to be operatively connected to and in fluid communication with the first and second air bags 26 and 28 when same are to be partially deflated.

In normal operation, the longitudinal axis of the axle load-distributing apparatus 10 will be aligned or substantially aligned with the longitudinal axis of the towing vehicle. In such instances the cam follower 238 will be adjacent the cam surface 232 of the cam 120 and the reciprocating shaft 236 of the cam valve 230 carrying the cam follower 238 will be in an extended position thereby allowing the air inlet 244 of the cam valve 230 to be in fluid communication with the first and second air bags 26 and 28 via the first air outlet 246 and air lines 338 and 340. When a sharp turn in the vehicle is made, and a predetermined angular relationship is created between the longitudinal axis of the towing vehicle and the axle load-distributing apparatus 10, the cam surface 232 of the cam 120, in combination with the cam follower 238 and the reciprocating shaft 236 of the cam valve 230, will detect the change in the angular relationship between the towing vehicle and the axle load-distributing apparatus 10 and cause the reciprocating shaft 236 of the cam valve 230 to be forced into a retracted position within the cylinder 234 of the cam valve 230. As the reciprocating shaft 236 of the cam valve is retracted into the cylinder 234 the reciprocating shaft closes off the air inlet 244 of the cam valve 230 and opens the second air outlet 242 of the cam valve 230 so that fluid communication is established between the second air outlet 242 and the first and second air bags 26 and 28 via the first air outlet 246 of the cam valve 230 and air lines 338 and 340. Thus, air is removed from the first and second air bags 26 and 28 and the first and second air bags 26 and 28 become partially deflated. Once the towing vehicle has completed the turn and has returned to its normal, aligned position, the reciprocating shaft 236 of the cam valve 230 will return to its extended position thus closing the second air outlet 242 of the cam valve 230 and opening the air inlet 244 of the cam valve 230 so that the first and second air bags 26 and 28 can be reinflated to the predetermined value by reestablishing fluid communication between air line 336 and air lines 338 and 340 through the cam valve 230.

When it is desirable to deflate the first and second air bags 26 and 28 to allow the lower frame 18 to be raised and secured to the cantilever 24 of the axle load-distributing apparatus 10 as hereinbefore described, the air regulator 256 is closed and the valve 258, a three-way valve, is moved to a position to allow the air pressure within the cam valve 230 and the first and second air bags 26 and 28 to be exhausted.

A simplified schematic diagram illustrating the pneumatic fluid supply for the lower frame raising assembly 300 of FIGS. 5 and 6 is shown in phantom in FIG. 4 and is set forth in more detail in FIG. 7. A valve 342 is operatively connected to and in fluid communication with air line 336 which is operatively connected to and in fluid communication with the air source of the towing vehicle as hereinbefore discussed. The valve 342, a three-way valve, is connected in one position to be in open fluid communication with the air line 336 and air bag 302 via air line 344; and, in another position, to openly communicate the air bag 302 with the atmosphere through an outlet 346 of the valve 342. In the third position, valve 342 seals off air from passing through the air line 344 to the air bag 302.

In operation, the lower frame raising assembly 300 is secured in its operable position as hereinbefore described with reference to FIGS. 5 and 6. Air is exhausted from the first and second air bags 26 and 28, and the three-way valve 342 is positioned to allow air to flow into the air line 344 and thus into the air bag 302. The inflation of the air bag 302 causes the lower frame 18 to be raised towards the cantilever 24 so that the lower frame 18 can be secured in a raised, inoperative position. When it is desired to deflate the air bag 302, the three-way valve 342 is moved into a position so that the outlet 346 of the valve 342 is in fluid communication with the air bag 302 through the valve 342 and air line 344 thereby allowing air within the air bag 302 to readily be exhausted.

It is clear that the present invention is well adapted to carry out the objects and attain the ends and advantages mentioned as well as those inherent therein. While a presently preferred embodiment of the invention has been described for purposes of this disclosure, numerous changes may be made which will readily suggest themselves to those skilled in the art and which are encompassed with the spirit of the invention disclosed and as defined in the appended claims.

What is claimed is:

1. An axle load-distributing apparatus for a vehicle having a frame mounted on wheel supported axles, said axle load-distributing apparatus comprising:
    a lower frame having a forward end and an opposed rearward end;
    at least one transverse load distributing axle mounted on said lower frame;
    a plurality of wheels bearingly mounted on said axle;
    hitch means pivotably connected to the forward end of said lower frame for connecting said lower frame to the motor vehicle and for providing said lower frame with a horizontal lateral swinging movement and a vertical movement with respect to said hitch means;
    a cantilever having a forward end and an upwardly inclined rearward end, the forward end of said cantilever being rigidly mounted to said hitch means for preventing vertical movement of said cantilever with respect to said hitch means and the forward end of said cantilever being pivotably connected to said hitch means for providing a horizontal lateral swinging movement of said cantilever with respect to said hitch means, the upwardly inclined rearward end of said cantilever extending upwardly over said lower frame means in a spaced relationship with said lower frame means;
    first pneumatic means operatively disposed between the rearward end of said cantilever and said lower frame so that in an activated position said first pneumatic means causes a downward force to be applied to said lower frame transferring a portion of the load on the rear axles of the vehicle to said load-distributing axle mounted on said lower frame; and
    tracking means interconnecting said cantilever and said hitch means for detecting changes in the angular relationship between the longitudinal axis of the motor vehicle and the longitudinal axis of said axle load distributing apparatus, said tracking means operatively connected to said first pneumatic means for at least partially deactivating said first pneumatic means when a predetermined angular relation between the longitudinal axis of the motor vehicle and the longitudinal axis of the axle load distributing apparatus is detected by said tracking means and for reactivating said first pneumatic means when the axle load distributing apparatus returns to a normal tracking position.

2. The axle load-distributing apparatus according to claim 1 wherein said lower frame comprises:
    a first side frame member having a forward end and an opposed rearward end;
    a second side frame having a forward end and an opposed rearward end, said second frame member being maintained in a parallel, spaced-apart relationship with said first side frame member;
    a first forward frame member having a forward end and an opposed rearward end;
    a second forward frame member having a forward end and opposed rearward end, the opposed rearward end of said first forward frame member being connected to the forward end of the first side frame member so that the forward end of the first forward frame member converges in a forward direction towards a central longitudinal axis between the first and second side frame members, and the opposed rearward end of said second forward frame member being connected to the forward end of the second side frame member so that the forward end of the second forward frame member converges in a forward direction towards the central longitudinal axis between the first and second side frame members; and
    coupling means secured to the converging forward ends of said first and second forward side frame members for pivotably connecting said lower frame to said hitch means so as to allow a vertical movement of said lower frame with respect to said hitch means.

3. The axle load-distributing apparatus according to claim 2 wherein a forward portion of each of said first and said second side frame member extends in a downwardly inclined forward direction and said coupling means comprises:
    a substantially U-shaped member secured to the converging, forward ends of said first and second forward frame members, said U-shaped member having a first forwardly extending leg and a second forwardly extending leg, said second forwardly extending leg being maintained in a parallel, spaced-apart relation with respect to said first leg, each of said first and second legs of said U-shaped members having a bore extending therethrough which is axially alignable one with another and positioned within said first and second legs so as to be substantially horizontal and transverse to the longitudinal axis of the towing vehicle and said axle load-distributing apparatus; and
    a first pivot pin means positionable within the bores of said first and second legs of said U-shaped member for pivotably securing said lower frame to said hitch member.

4. The axle load-distributing apparatus according to claim 3 wherein said hitch means comprises: p1 a body having a vertically disposed bore therein, said body having an upper support surface and a lower connecting surface; and a forwardly extending coupling means for connecting said body of said hitch means to the vehicle.

5. The axle load-distributing apparatus according to claim 4 wherein said cantilever is further provided with a lower connecting surface at its forward end and wherein said lower frame further includes:

a lower strut member having a forward end portion containing a substantially vertically disposed bore extending therethrough, and a rearward end position containing a substantially horizontally disposed bore extending therethrough, the forward end portion of said lower strut member being further provided with an upper support surface for pivotable abuttment with the lower connecting surface of the body of said hitch means and the rearward end portion of said lower strut member being provided with an upwardly inclined, rearwardly extending support surface for abutting with the lower connecting surface of the forward end of the cantilever for securing said cantilever to the rearward end portion of said lower strut member, the rearward end portion of said lower strut member containing the substantially horizontally disposed bore being adapted to be positionable between the first and second legs of the substantially U-shaped member so that the substantially horizontally disposed bore of said lower strut member is aligned with the bores in the first and second legs and adapted to receive said first pivot pin means; and a second pivot pin means positionable within the substantially vertically disposed bore in the forward end portion of said lower strut member and the vertically disposed bore within the body of said hitch means for pivotably securing said lower strut member to the body of said hitch means.

6. The axle load-distributing apparatus according to claim 5 wherein said cantilever is further provided with an upper support surface at its forward end and said axle load-distributing apparatus further comprises:

an upper strut member having a forward and a rearward end portion, the forward end portion of said upper strut member containing a substantially vertically disposed bore extending therethrough, said upper strut member further characterized as having a lower connecting surface on its forward end portion for pivotable abuttment with the upper support surface of the body of said hitch means, the rearward end portion of said upper strut member having an upwardly, rearwardly extending lower connecting surface for abutting with the upper support surface of the forward end of the cantilever for securing said cantilever to the rearward end portion of said lower strut member; and a third pivot pin means positionable within the substantially vertically disposed bore in the forward end portion of said upper strut member and the substantially vertically disposed bore within the body of said hitch means for pivotably securing said upper strut member to the body of said hitch means.

7. The axle load-distributing apparatus according to claim 6 wherein said second and third pin means for pivotably securing said lower strut member to the body of said hitch means and said upper strut member to the body of said hitch means comprise a single pivot pin.

8. The axle load-distributing apparatus according to claim 6 wherein said lower frame further comprises:

a first support member having a first end and an opposed second end, the first end of said first support member being secured to the opposed rearward end of said first side frame member and the opposed second end of said first support member being secured to the opposed rearward end of said second side frame member;

a second support member having a first end and an opposed second end, the first end of said second support member being secured to said first side frame member at a position substantially intermediate the forward end and the opposed rearward end of said first side frame member, and the opposed second support member being secured to said second side frame member at a position substantially intermediate the forward end and the opposed rearward end of said second side frame member; and a first support plate having a first end and an opposed second end, the first end of said first support plate being secured to the downwardly inclined, forwardly extending forward portion of said first side frame member and the opposed second end of said first support plate being secured to the downwardly inclined, forwardly extending forward portion of said second side frame member.

9. The axle load-distributing apparatus according to claim 8 wherein said cantilever comprises:

a first side member having a forward end, a rearwardly, upwardly extending opposed end, an upper side and a lower side;

a second side member having a forward end, a rearwardly, upwardly extending opposed end, an upper side, and a lower side, said first and second side members being joined at their forward ends so that their rearward ends diverge outwardly from one another and provide a substantially V-shaped configuration; and a cross support member having a first end and an opposed second end, the first end of said cross support member being secured to the opposed end of said first side member of said cantilever and the opposed second end of said cross support member being secured to the opposed end of said second side member of said cantilever.

10. The axle load-distributing apparatus according to claim 9 wherein said cantilever further includes:

a second support plate having a first end and an opposed second end, the first end of said second support plate being secured to the lower side of said first side member of said cantilever near the opposed end of said first side member, and the opposed second end of said second support plate being secured to the lower side of said second side member of said cantilever near the opposed end of said second side member.

11. The axle load-distributing apparatus according to claim 10 wherein said first pneumatic means comprises;

a first air bag, having an upper end and a lower end;

a second air bag having an upper end and a lower end, said first and second air bags being in a substantially parallel, spaced-apart relation and disposed within a space formed between said first support plate and said second support plate;

first securing means for attaching the upper end of said first and second air bags to said second support plate; and second securing means for attaching the lower end of said first and second air bags to said first support plate.

12. The axle load-distributing apparatus according to claim 11 wherein said tracking means comprises:

a cam mounted on the body of said hitch means; and a cam valve mounted on the forward end portion of said cantilever, said cam valve operatively engaging said cam and establishing, in one position, fluid communication between said first and second air bags and a second air supply reservoir, and in a second position, fluid communication between said first and second air bags and the atmosphere.

13. The axle load-distributing apparatus according to claim 12 wherein said cam is provided with a cam surface and said cam valve comprises:

a cylinder having a first air inlet, a first air outlet, and a second air outlet;

a reciprocating shaft operatively disposed in said cylinder, said shaft having one end extending outwardly therefrom; and a cam follower secured to the outwardly extending end of said shaft, said cam follower being positioned adjacent the cam surface so that when the reciprocating shaft is in a first extended position fluid communication is established between the first air inlet and the first air outlet of said cylinder and when the reciprocating shaft is in a predetermined second retracted position fluid communication is established between the first air outlet and the second air outlet of said cylinder.

14. The axle load distributing apparatus according to claim 12 which further includes locking means operatively connected to the lower frame and the rearwardly extending end of said cantilever for receiving said lower frame to said cantilever in a raised, inoperative position.

15. The axle load-distributing apparatus according to claim 13 wherein said locking means comprises at least one hook pivotally secured to said lower frame and at least one bracket secured to said cantilever and adapted to receive said hook in a locking engagement.

16. The axle load-distributing apparatus according to claim 14 wherein said apparatus further includes:

brake units operatively connected to the wheels of said apparatus;

a first air reservoir mounted on said lower frame, said first air reservoir operatively connected to and in fluid communication with the air supply source of the vehicle and said brake units;

a priority valve operatively connected to and in fluid communication with said first air reservoir and the air supply source of the vehicle for preferentially supplying air to said first reservoir;

said second air reservoir mounted on said lower frame, said second air reservoir operatively connected to and in fluid communication with the air supply source of the vehicle and the first air reservoir through said priority valve and said first and second air bags via said cam valve.

17. The axle load-distributing apparatus according to claim 16 which further includes control means operatively disposed between said second air reservoir and said cam valve for regulating the pressure of the air supplied to said first and second air bags from said second air reservoir via said cam valve.

18. The axle load-distributing apparatus according to claim 17 which further comprises at least one landing gear pivotably secured to the lower frame so that the landing gear means can be maintained in a first raised inoperative position or can be pivoted and maintained in a second lowered position for raising the lower frame.

19. The axle load-distributing apparatus according to claim 1 wherein said cantilever is provided with an upper side and said axle load-distributing apparatus further comprises a second pneumatic means secured to the upper side of said cantilever, said second pneumatic means operatively connectable to said lower frame and operatively connected to a pneumatic source for activation of said second pneumatic means so that when said first pneumatic means is in a deactivated condition said second pneumatic means can be activated for raising said lower frame to an inoperative position.

20. The axle load-distributing apparatus according to claim 19 wherein said lower frame comprises:

a first side frame member having a forward end and an opposed rearward end;

a second side frame having a forward end and an opposed rearward end, said second frame member being maintained in a parallel, spaced-apart relationship with said first side frame member;

a first forward frame member having a forward end and an opposed rearward end;

a second forward frame member having a forward end and opposed rearward end, the opposed rearward end of said first forward frame member being connected to the forward end of the first side frame member so that the forward end of the first forward frame member converges in a forward direction towards a central longitudinal axis between the first and second side frame members, and the opposed rearward end of said second forward frame member being connected to the forward end of the second side frame member so that the forward end of the second forward frame member converges in a forward direction towards the central longitudinal axis between the first and second side frame members; and coupling means secured to the converging forward ends of said first and second forward side frame members for pivotably connecting said lower frame to said hitch means so as to allow a vertical movement of said lower frame with respect to said hitch means.

21. The axle load-distributing apparatus according to claim 20 wherein a forward portion of each of said first and said second side frame member extends in a downwardly inclined forward direction and said coupling means comprises:

a substantially U-shaped member secured to the converging, forward ends of said first and second forward frame members, said U-shaped member having a first forwardly extending leg and a second forwardly extending leg, said second forwardly extending leg being maintained in a parallel, spaced-apart relation with respect to said first leg, each of said first and second legs of said U-shaped members having a bore extending therethrough which is axially alignable one with another and positioned within said first and second legs so as to be substantially horizontal and transverse to the longitudinal axis of the towing vehicle and said axle load-distributing apparatus; and a first pivot pin means positionable within the bores of said first and second legs of said U-shaped member for pivotably securing said lower frame to said hitch member.

22. The axle load-distributing apparatus according to claim 21 wherein said hitch means comprises:
 a body having a vertically disposed bore therein, said body having an upper support surface and a lower connecting surface; and
 a forwardly extending coupling means for connecting said body of said hitch means to the vehicle.

23. The axle load-distributing apparatus according to claim 22 wherein said cantilever is further provided with a lower connecting surface at its forward end and wherein said lower frame further includes:
 a lower strut member having a forward end portion containing a substantially vertically disposed bore extending therethrough, and a rearward end position containing a substantially horizontally disposed bore extending therethrough, the forward end portion of said lower strut member being further provided with an upper support surface for pivotable abutment with the lower connecting surface of the body of said hitch means and the rearward end portion of said lower strut member being provided with an upwardly inclined, rearwardly extending support surface for abutting with the lower connecting surface of the forward end of the cantilever for securing said cantilever to the rearward end portion of said lower strut member, the rearward end portion of said lower strut member containing the substantially horizontally disposed bore being positionable between the first and second legs of the substantially U-shaped member so that the substantially horizontally disposed bore of lower strut member is aligned with the bores in the first and second legs and adapted to receive said first pivot pin means; and
 a second pivot pin means positionable within the substantially vertically disposed bore in the forward end portion of said lower strut member and the vertically disposed bore within the body of said hitch means for pivotably securing said lower strut member to the body of said hitch means.

24. The axle load-distributing apparatus according to claim 23 wherein said cantilever is further provided with an upper support surface at its forward end and said axle load-distributing apparatus further comprises:
 an upper strut member having a forward and a rearward end portion, the forward end portion of said upper strut member containing a substantially vertically disposed bore extending therethrough, said upper strut member further characterized as having a lower connecting surface on its forward end portion for pivotable abutment with the upper support surface of the body of said hitch means, the rearward end portion of said upper strut member having an upwardly, rearwardly extending lower connecting surface for abutting with the upper support surface of the forward end of the cantilever for securing said cantilever to the rearward end portion of said lower strut member; and
 a third pivot pin means positionable within the substantially vertically disposed bore in the forward end portion of said upper strut member and the substantially vertically disposed bore within the body of said hitch means for pivotably securing said upper strut member to the body of said hitch means.

25. The axle load-distributing apparatus according to claim 24 wherein said second and third pin means for pivotably securing said lower strut member to the body of said hitch means and said upper strut member to the body of said hitch means comprise a single pivot pin.

26. The axle load-distributing apparatus according to claim 24 wherein said lower frame further comprises:
 a first support member having a first end and an opposed second end, the first end of said first support member being secured to the opposed rearward end of said first side frame member and the opposed second end of said first support member being secured to the opposed rearward end of said second side frame member;
 a second support member having a first end and an opposed second end, the first end of said second support member being secured to said first side frame member at a position substantially intermediate the forward end and the opposed rearward end of said first side frame member, and the opposed second end of said second support member being secured to said second side frame member at a position substantially intermediate the forward end and the opposed rearward end of said second side frame member; and
 a first support plate having a first end and an opposed second end, the first end of said first support plate being secured to the downwardly inclined, forwardly extending forward portion of said first side frame member and the opposed second end of said first support plate being secured to the downwardly inclined, forwardly extending forward portion of said second side frame member.

27. The axle load-distributing apparatus according to claim 26 wherein said cantilever comprises:
 a first side member having a forward end, a rearwardly, upwardly extending opposed end, an upper side and a lower side;
 a second side member having a forward end, a rearwardly, upwardly extending opposed end, an upper side, and a lower side, said first and second side members being joined at their forward ends so that their rearward ends diverge outwardly from one another and provide a substantially V-shaped configuration; and
 a cross support member having a first end and an opposed second end, the first end of said cross support member being secured to the opposed end of said first side member of said cantilever and the opposed second end of said cross support member being secured to the opposed end of said second side member of said centilever.

28. The axle load-distributing apparatus according to claim 27 wherein said cantilever further includes:
 a second support plate having a first end and an opposed second end, the first end of said second support plate being secured to the lower side of said first side member of said cantilever near the opposed end of said first side member, and the opposed second end of second side member.

29. The axle load-distributing apparatus according to claim 28 wherein said first pneumatic means comprises:
 a first air bag, having an upper end and a lower end;
 a second air bag having an upper end and a lower end, said first and second air bags being in a substantially parallel, spaced-apart relation and disposed within a space formed between said first support plate and said second support plate;

first securing means for attaching the upper end of said first and second air bags to said second support plate; and second securing means for attaching the lower end of said first and second air bags to said first support plate.

30. The axle load-distributing apparatus according to claim 29 wherein said tracking means comprises:

a cam mounted on the body of said hitch means; and a cam valve mounted on the forward end portion of said cantilever, said cam valve operatively engaging said cam and establishing, in one position, fluid communication between said first and second air bags and a second air supply reservoir, and in a second position, fluid communication between said first and second air bags and the atmosphere.

31. The axle load-distributing apparatus according to claim 30 wherein said cam is provided with a cam surface and said cam valve comprises:

a cylinder having a first air inlet, a first air outlet, and a second air outlet;

a reciprocating shaft operatively disposed in said cylinder, said shaft having one end extending outwardly therefrom; and, a cam follower secured to the outwardly extending end of said shaft, said cam follower being positioned adjacent the cam surface so that when the reciprocating shaft is in a first extended position fluid communication is established between the first air inlet and the first air outlet of said cylinder and when the reciprocating shaft is in a predetermined second retracted position fluid communication is established between the first air outlet and the second air outlet of said cylinder.

32. The axle-load distributing apparatus according to claim 31 which further includes locking means operatively connected to the lower frame and the rearwardly extending end of said cantilever for securing said lower frame to said cantilever in a raised inoperative position.

33. The axle load-distributing apparatus according to claim 32 wherein said locking means comprises at least one hook pivotally secured to said lower frame and at least one bracket secured to said cantilever and adapted to receive said hook in a locking engagement.

34. The axle load-distributing apparatus according to claim 32 wherein said apparatus further includes:

brake units operatively connected to the wheels of said apparatus;

a first air reservoir mounted on said lower frame, said first air reservoir operatively connected to and in fluid communicatiion with the air supply source of the vehicle and said brake units;

a priority valve operatively connected to and in fluid communication with said first air reservoir and the air supply source of the vehicle for preferentially supplying air to said first reservoir;

said second air reservoir mounted on said lower frame, said second ar reservoir operatively connected to and in fluid communication with the air supply source of the vehicle and the first air reservoir through said priority valve and said first and second air bags via said cam valve.

35. The axle load-distributing apparatus according to claim 34 which further includes control means operatively disposed between said second air reservoir and said cam valve for regulating the pressure of the air supplied to said first and second air bags from said second air reservoir via said cam valve.

36. The axle load-distributing apparatus according to claim 35 which further comprises at least one landing gear pivotably secured to the lower frame so that the landing gear means can be maintained in a first raised inoperative position or can be pivoted and maintained in a second lowered position for raising the lower frame.

37. The axle load-distributing apparatus according to claim 36 wherein said cantilever further includes:

a third support plate having a first end, and an opposed second end, the first end of said third support plate being secured to the upper side of said first side member of said cantilever near the opposed end of said first side member, and the opposed second end of said third support plate being secured to the upper side of said second side member of said cantilever near the opposed end of said second side member, said third support plate being positioned in a parallel, spaced relationship with said second support plate.

38. The axle load-distributing apparatus according to claim 37 wherein said second pneumatic mean comprises:

a third air bag having an upper end and a lower end, said third air bag being positioned on said third support plate so as to be substantially intermediate the central axis of said first and second air bags; and a third securing means for attaching the lower end of said third air bag to said third support plate;

and wherein said axle load-distributing apparatus further includes:

a cover plate secured to the upper end of the third air bag; and means for operationally connecting said cover plate to said lower frame for raising said lower frame to an inoperative raised position when the first and second air bags are deflated and said third air bag is inflated.

39. The axle load-distributing apparatus according to claim 38 wherein said cover plate is further provided with a first downwardly extending leg member and a second downwardly extending leg member, said first and second leg members being secured to said cover so that said second leg member is in a substantially parallel, spaced apart relationship with said first leg member and so that when said third air bag is in a deflated condition said first and second leg members extend downwardly beyond said first side member and said second side member of said cantilever and when said third air bag is in an inflated condition said first and second leg members extend downwardly towards the upper side of said first and second frame members of said cantilever.

40. The axle load-distributing apparatus according to claim 38 wherein said means connecting said cover plate to said lower frame comprises:

a first chain having a first end and an opposed second end, the first end of said first chain pivotably secured to said cover plate and the opposed second end of said first chain adjustably secured to said lower frame, said first chain positioned to extend along an exterior side of said first leg member; and a second chain having a first end and an opposed second end, the first end of said second chain pivotably secured to said cover plate and the opposed second end of said second chain to said lower frame, said second chain positioned to extend along an exterior side of said second leg member.

* * * * *